United States Patent
Li et al.

(10) Patent No.: US 8,046,793 B2
(45) Date of Patent: Oct. 25, 2011

(54) FAVORITES PROGRAM SELECTION

(75) Inventors: Baoxin Li, Vancouver, WA (US); Hao Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2260 days.

(21) Appl. No.: 10/404,288

(22) Filed: Mar. 31, 2003

(65) Prior Publication Data

US 2004/0019907 A1    Jan. 29, 2004

Related U.S. Application Data

(60) Provisional application No. 60/399,241, filed on Jul. 29, 2002.

(51) Int. Cl.
*H04N 5/445* (2011.01)

(52) U.S. Cl. ............... 725/38; 725/58; 725/46; 725/47

(58) Field of Classification Search ............... 725/42, 725/43
See application file for complete search history.

(56) References Cited

U.S. PATENT DOCUMENTS

| | | | |
|---|---|---|---|
| 5,978,043 A | 11/1999 | Blonstein et al. | |
| 6,075,575 A | 6/2000 | Schein et al. | |
| 6,084,644 A | 7/2000 | Atkinson | |
| 6,094,239 A | 7/2000 | Weber | |
| 6,175,362 B1 | 1/2001 | Harms et al. | |
| 6,285,414 B1 | 9/2001 | Chilamakuri | |
| 6,317,168 B1 | 11/2001 | Seo | |
| 6,317,883 B2 * | 11/2001 | Marics | 725/56 |
| 6,359,661 B1 | 3/2002 | Nickum | |
| 6,369,861 B1 | 4/2002 | Lownes | |
| 6,407,779 B1 | 6/2002 | Herz | |
| 6,426,779 B1 | 7/2002 | Noguchi et al. | |
| 6,934,917 B2 * | 8/2005 | Lin | 715/811 |
| 7,055,167 B1 * | 5/2006 | Masters | 725/39 |
| 7,146,627 B1 * | 12/2006 | Ismail et al. | 725/47 |
| 7,284,256 B2 * | 10/2007 | Candelore et al. | 725/46 |
| 2002/0188948 A1 * | 12/2002 | Florence | 725/46 |
| 2003/0056216 A1 * | 3/2003 | Wugofski et al. | 725/46 |
| 2006/0031881 A1 * | 2/2006 | Barrett et al. | 725/46 |

* cited by examiner

*Primary Examiner* — Pankaj Kumar
*Assistant Examiner* — Timothy Newlin
(74) *Attorney, Agent, or Firm* — Chernoff Vilhauer McClung & Stenzel LLP

(57) ABSTRACT

The selection of favorites for a video presentation system.

16 Claims, 6 Drawing Sheets

USER SELECTS

Channel

Ignore selected Channel if viewed duration is less than the threshold.

Tabulate duration over period of time that the Channel is selected.

Tabulate duration based upon content.

Tabulate duration based upon time of day.

Tabulate duration based upon the day of week or month.

| | | | | | |
|---|---|---|---|---|---|
| Movies Guide | | | | Thurs 12/16/94 1:54PM | |
| | 12:30 PM | 1:00PM | 1:30PM | 2:00PM | |
| OTV 149 | Seduce Me: Pamela Principle 2 | | | Seduce Me: Pamela Pr... | |
| MTV 150 | Top Rap Videos | | Music of the 70's | | |
| CTV 151 | Cooking with Linus | | Comedy Club | | |
| OTV 154 | The Ref | | | The Ref | |
| OTV 155 | Star Trek | | The Chase | | |
| STV 156 | Wildlife Safari | | | Ancient Civilizations | |
| ◀ | Themes | Sports | Other | All | Exit |

FIG. 1

USER SELECTS

Channel

Ignore selected Channel if viewed duration is less than the threshold.

Tabulate duration over period of time that the Channel is selected.

Tabulate duration based upon content.

Tabulate duration based upon time of day.

Tabulate duration based upon the day of week or month.

FIG. 5

FAVORITES PROGRAM SELECTION

This application claims the benefit of U.S. Provisional Patent Application Ser. No. 60/399,241 filed on Jul. 29, 2002.

BACKGROUND OF THE INVENTION

The present invention relates to video favorites.

Television broadcasting technology has improved tremendously since its inception. Television signals are broadcasted on the airwaves, broadcast through cable, fibre, and networked connections, and broadcast via satellites. The number of available stations readily accessible today has increased from one to hundreds, if not thousands, of stations. To select a program to view, many viewers simply use the remote control to "channel surf" until they find a channel that has a desirable program. Channel surfing refers to the process of using the channel "+" or "−" key on the remote control to sequentially view each channel on the display. Although some viewers find channel surfing among hundreds of stations enjoyable, most viewers prefer a more direct method for selecting a program to view.

Some systems, for example, the RCA Direct Satellite System or DSS (Direct Satellite System and DSS are trademarks of Hughes Communications, a division of General Motors Corp.), provide a television channel selection guide which displays a listing of the channels typically in numeric order and the titles of the programs broadcasted or to be broadcasted on the channels. A simplified block diagram of such a guide is illustrated in FIG. 1. The viewer or user of the system may then select the channel by entering in the number or selecting the device. The system responds by removing the guide displayed and tuning to the station selected and displaying the broadcasting signals of the station.

This system has a number of drawbacks. The guide provides only the title of the program. To get additional information, such as a written description of the program, the user must select an information button which responds by bringing up a second layer of the menu having the program description. Thus, as the number of stations increase, the efficiency of reviewing programs and program descriptions decreases. Furthermore, many viewers prefer to view the actual broadcast before determining whether to select that station to watch. Therefore, the user has to select each station to view, and subsequently go back to the channel guide in order to view program titles on other channels. Of course, the user can always channel surf by skipping from channel to channel in sequence using the channel "+" or "−" buttons.

Typical television viewers will have favorite stations which they like to watch. Some systems provide a channel skip function in which a viewer or user of the system can designate those channels that they prefer to view by selecting those channels from a displayed list of channels. Thereafter, using the channel "+" or "−" buttons, the user can sequentially view those selected channels.

Chilamakuri et al., U.S. Pat. No. 6,285,414, disclose a channel selector for a television receiver for deselecting specified channels for a predetermined period of time. When a channel has been deselected it will be skipped when a user "surfs" through the sequence of channels. After the predetermined period of time expires the deselected channel is returned to the sequence of available channels. Channels may be deselected for time periods corresponding to a standard time slot, for example each half hour. Alternatively, channels may be deselected for periods corresponding to the actual length of the program determined from transmitted program scheduling data. While of some benefit to reduce the number of channels while the user channel surfs, the de-selection only lasts for a limited duration. Moreover, it is burdensome to manually de-select many channels from a selection of hundreds.

Atkinson, U.S. Pat. No. 6,084,644, discloses a television remote control with channel-defined keys. The remote control includes a plurality of control keys having a pair of volume keys for remotely controlling a volume of the television, and a pair of channel toggle keys for remotely changing channels of the television in an incrementing and decrementing manner. The remote control also includes a plurality of user keys configured in a matrix. Each user key effects the transmission of a signal to change the channel of the television to a predetermined channel associated with the user key. Each user key has indicia associated therewith which corresponds with the corresponding channel. While efficient after the user has gone through the arduous task of programming all the keys, it is quite burdensome to reprogram the keys each time the user's preferences change.

Blondstein, et al., U.S. Pat. No. 5,978,043 disclose a television (TV) graphical user interface (GUI) in a satellite TV system to enable users to create customized channel lists. Everyday, favorite and theme lists may be generated to respectively combine TV channels being watched regularly, favorite TV channels and channels relating to particular subjects. In a regular channel changer mode, the TV GUI displays graphical channel changer composed of channel boxes that show numbers and logos of available TV channels. To create a customized channel list, the TV GUI is switched into a change list content mode, wherein a channel grid is displayed in addition to the channel changer. Using a "drag and drop" procedure, graphical boxes corresponding to selected channel boxes may be moved from the channel changer to cells of the channel grid, to create a customized list of TV channels or to add new channels to an existing list. TV channels may be removed from the list by moving boxes that represent unwanted channels from the grid and placing them outside the grid area. TV channels may be put into the customized list in order of their priority established by the user. The position, graphical configuration and operations of the channel changer that represent the customized channel list remain unchanged compared with the channel changer in the regular channel changer mode. Accordingly, the user manually creates a favorites list which the user accesses through a set of actions.

Noguchi, et al., U.S. Pat. No. 6,426,779, disclose a line guide that provides the user of a multiple channel television broadcast system with programming information. The guide enables the user to select a particular program to watch. In particular, the system enables the user to scan program information of channels that the user has designated as his favorite channels. A button is provided that is designated as "favorite". When the user is in a broadcast guide and selects the button, the system responds by displaying program information regarding the favorite stations at the top of the guide. Thus, the user sees at the top of the list the current programming with respect to his favorite stations, followed by program information for the remaining stations. Accordingly, the user manually creates a favorites list, and in response to pressing the button designated as "favorite" while browsing an electronic program guide, presents the list of favorites.

Sony, in a WEGA TV KV-32FS13, incorporates a favorite channel button on the remote control. The favorite channel functionality may alternatively be, access to any one of 5 programmed channels, or access to the last 5 channels that the user just watched or switched through.

BRIEF DESCRIPTION OF THE DRAWINGS

FIG. 1 illustrates an electronic programming guide.
FIG. 5 illustrates determination of the favorites.

DETAILED DESCRIPTION OF THE PREFERRED EMBODIMENTS

In the system described herein the broadcast system may be a direct broadcast satellite system or any system which has the capability of receiving and displaying a multiplicity of stations. Furthermore, in the following description, for purposes of explanation, numerous details are set forth, such as menus, flowcharts and system configurations, in order to provide a thorough understanding. However, it will be apparent to one skilled in the art that these specific details are not required. In other instances, well known electrical structures and circuits are shown in block diagram form.

The present inventors considered the existing favorite channel features of existing systems and determined that they are either to cumbersome for a user to effectively use in a hurried and busy lifestyle, or otherwise to simplistic to provide useful information. Moreover, the present inventors have come to the realization that the user's favorites tend to change over time, and tend to change depending on the particular time of the day and/or the day of the week. Further, the present inventors have come to the realization that the user's viewing habits are temporal in nature and accordingly the user's actual preferences may be related, in some manner, to the duration that a particular video content is watched.

Figure 2:
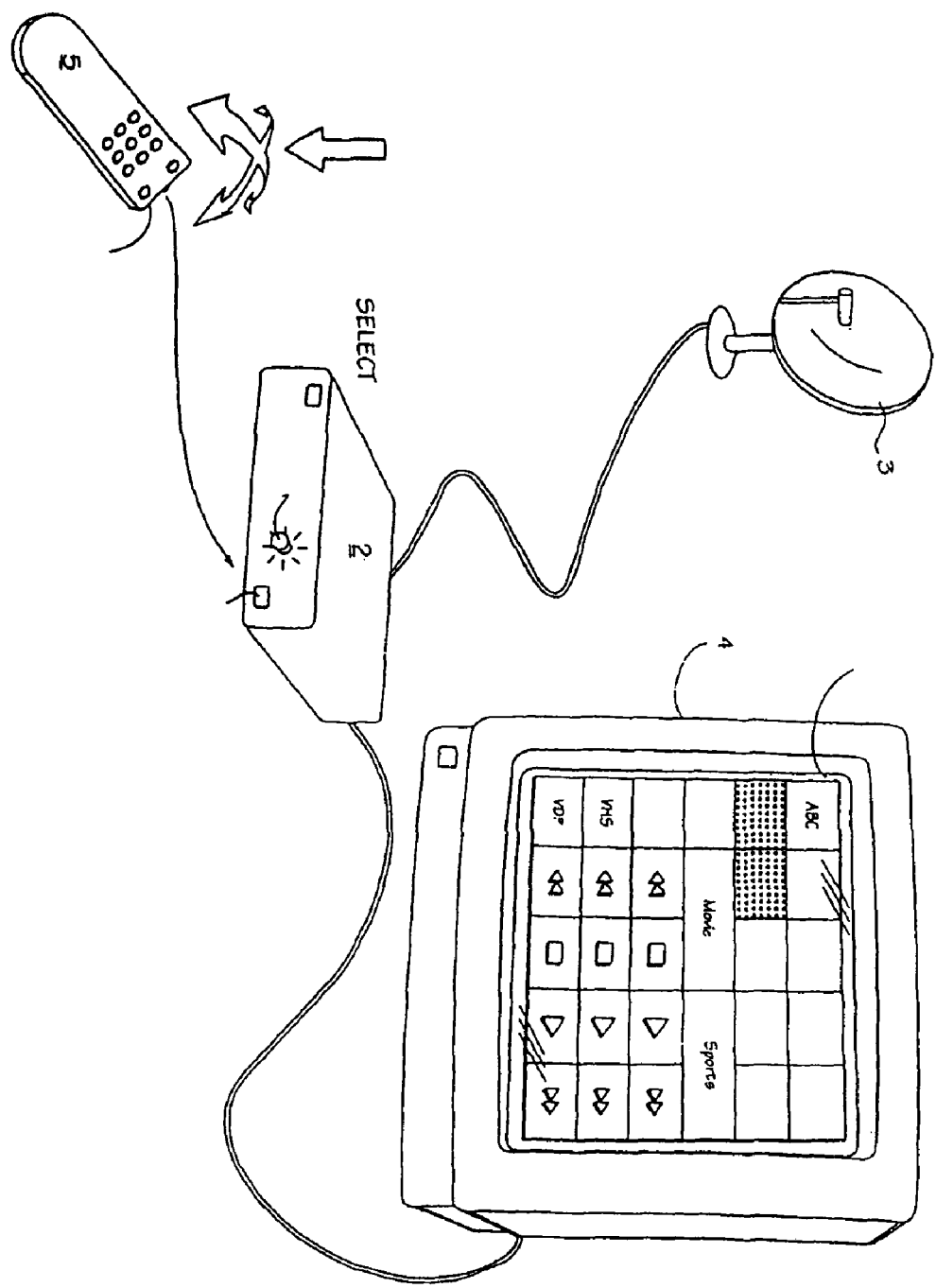
FIG. 2 illustrates a television system.

FIG. 2 is a simplified diagram illustrating a satellite system. The system includes an antenna 3, an integrated receiver/decoder 2 (IRD), a remote controller 5 and a monitor 4. The video, normally in the form of packets, is transmitted by a transponder on the satellite. Each transponder normally transmits data in a time share manner at a predetermined frequency. A tuner of a decoder is tuned in to the frequency of the transponder corresponding to a channel, which is designated by a viewer so that the packets of digital data are received by the decoder.

The antenna 3 receives the video signal sent from a satellite. The video signal is provided to the IRD. The antenna 3 may include a block down converter (LNB). The LNB converts the frequency of the signal sent from the satellite to a lower frequency. The converted signal is supplied to the IRD. The monitor 4 receives a signal from the IRD.

Figure 3:
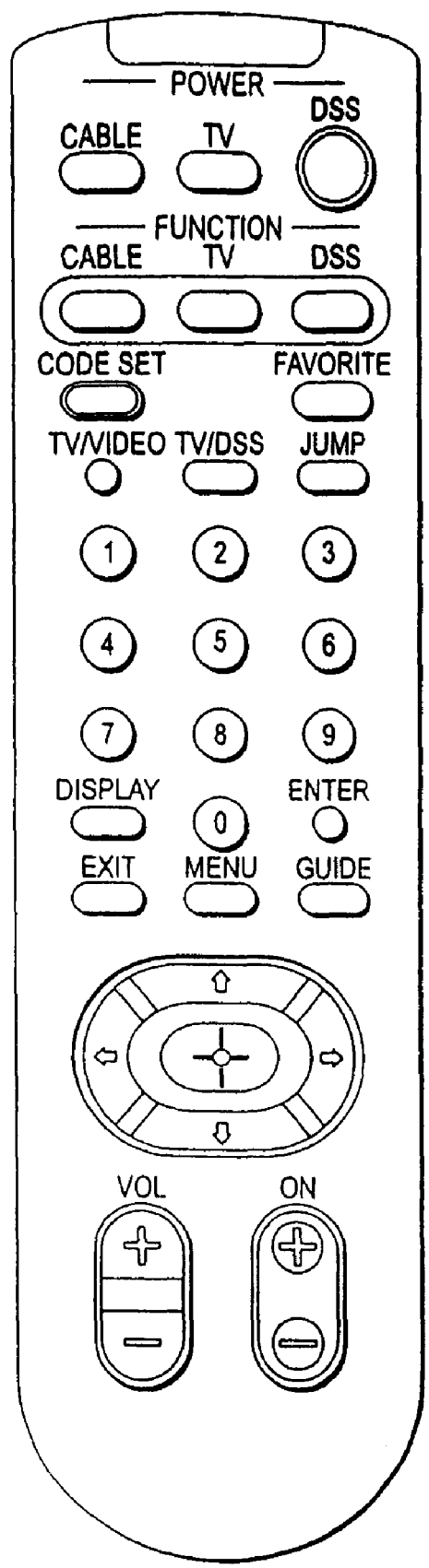
FIG. 3 illustrates a remote control.
Figure 4:
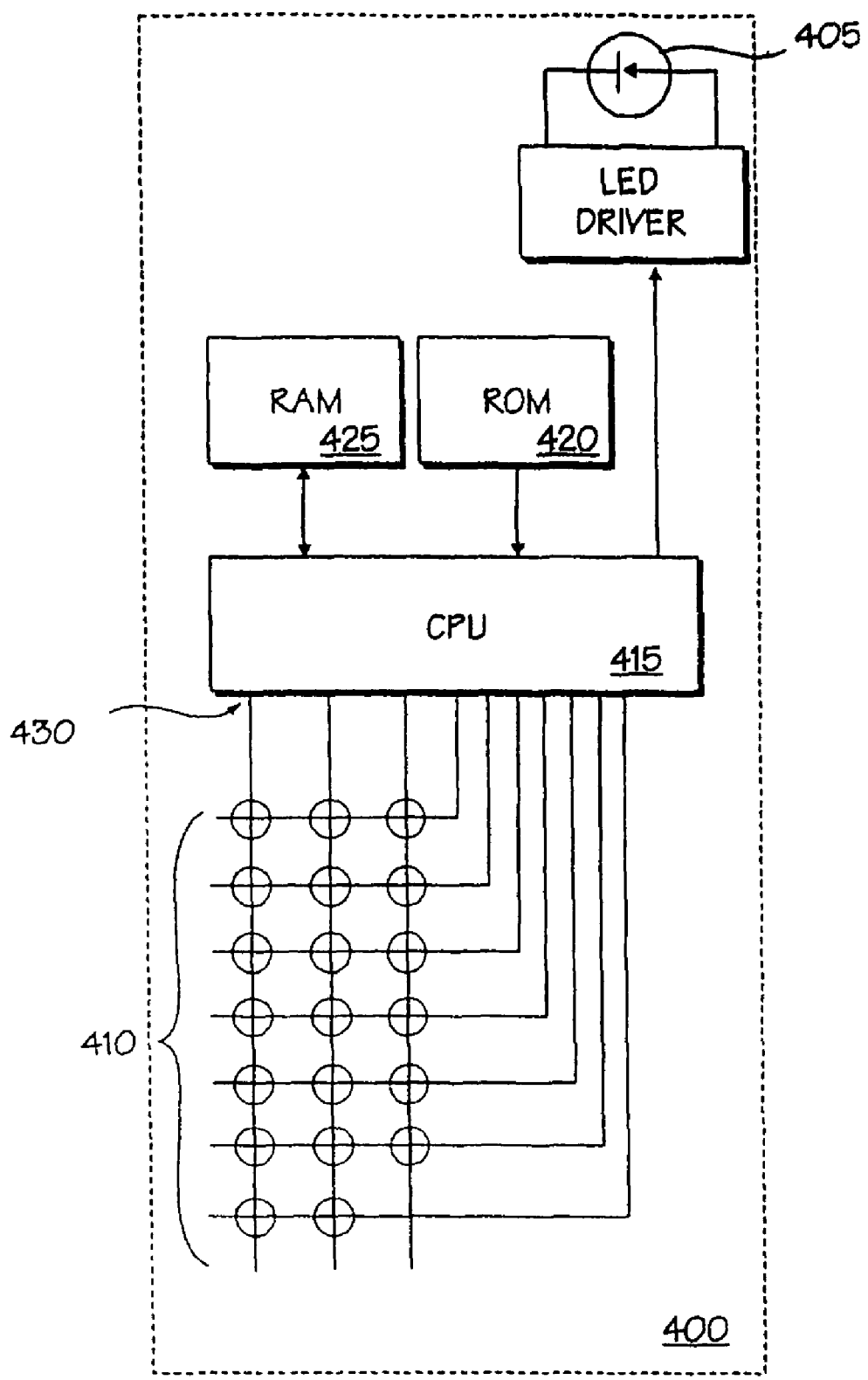
FIG. 4 illustrates functionality of the remote control.

FIG. 3 shows an example of a remote controller utilized by a user to transmit commands and make program selections in accordance with the teachings of the present invention. FIG. 4 is simplified a block diagram of the remote controller. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting code. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad, and an "ENTER" key. The set of operation buttons 410 enable the user to select programs through the electronic programming guide in accordance with the teachings of the present invention.

Referring to FIG. 5, while the user watches particular television channels or otherwise changes the channel the system identifies the particular television channel selected as one of potential interest to the user. In the case that the selected television is viewed for a duration shorter than a threshold value, such as 20 seconds, the selected channel may be omitted from the potential favorites list, if desired. The duration that different particular television channels are observed may be tabulated over a period of time, such as 7 days. Based upon the temporal viewing habits of particular television channels the system may determine a set of likely favorites for the user. The favorites may be limited to a predetermined number of channels or otherwise less than all available channels.

After further consideration it turns out that users tend to watch different programming at different times of the day. For example, some users may tend to watch channel 6 in the morning, channel 8 between 4-5 pm, and channel 10 late in the evening. Referring to FIG. 5, the selected channels may likewise depend on the particular time of the day that the channels are observed. For example, the time of the day may be defined as morning, afternoon, evening; by hour (e.g., truncating the minutes); hour range; minute range; etc. This permits more accurate selection of the favorites by the system.

After further consideration it turns out that users tend to watch different programming on different days of the week or month. For example, some users may tend to watch channel 6 on Wednesday; channel 8 on Thursday; and channel 10 on Saturday. Referring to FIG. 5, the selected channels may likewise depend on the particular day of the week or month that the channels are observed. For example, the day of the week may be defined as Monday, Tuesday, Wednesday, Thursday, Friday, Saturday, and Sunday. This permits more accurate selection of the favorites by the system. The day of the week/month together with the time of the day modifications are preferably used in combination with one another.

In the case that additional information is available regarding the content of the program being observed the favorites may be further determined based upon the content related information. For example, some content related information may include genre, sports, basketball, football, adult programming, child programming, etc. In addition, the content descriptions may include any of those described in the MPEG-7 standard specification.

Figure 6:
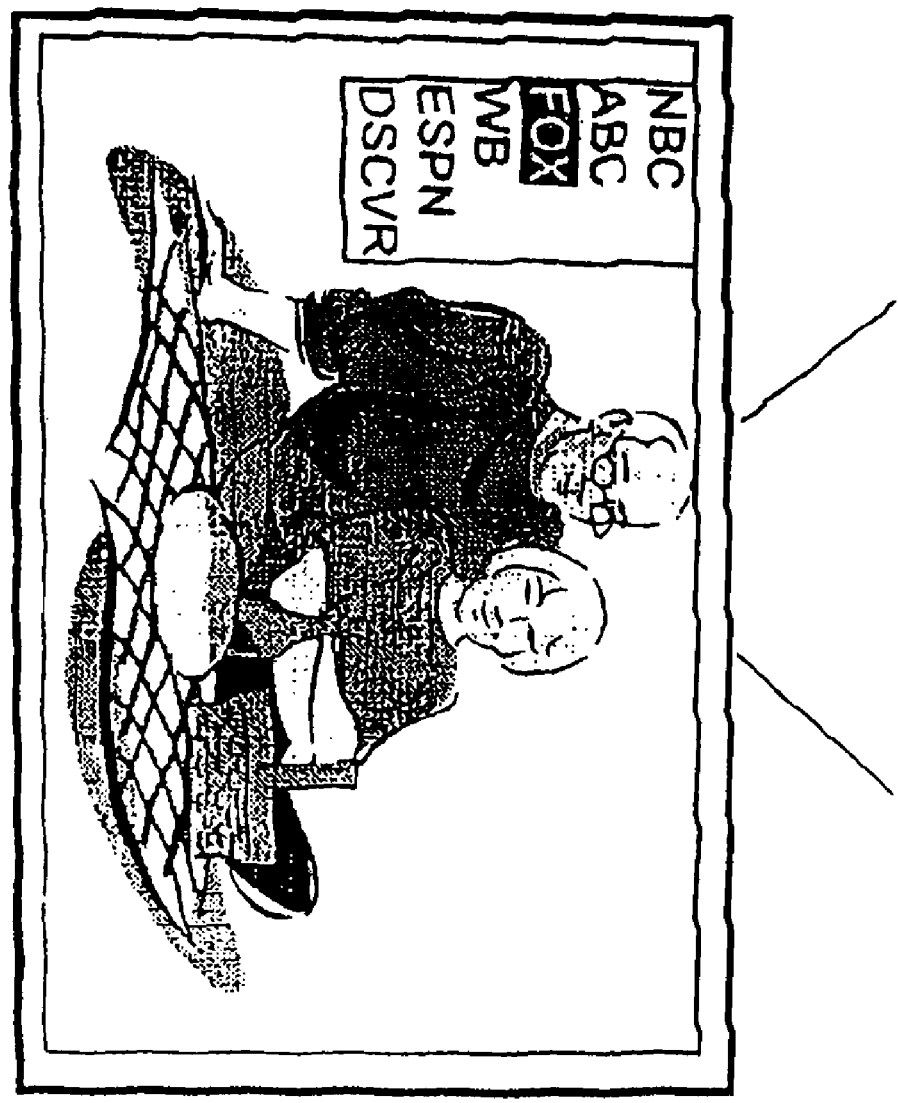
FIG. 6 illustrates the presentation of the favorites.

Any suitable mechanism may be used to select the potential favorites based upon one or more of the previous characteristics. In addition, the potential favorites may be ranked in some manner based upon the selection criterion used. Referring to FIG. 6, with the selected channels ranked according to a user's preference, the highest ranked channel is preferably presented to the user first as an option, and so forth, through the set of favorites. The presentation of the "first" channel take many forms, such as for example, (1) showing a set of channels with the highest ranking one first in the list, (2) changing through the favorites one-by-one with the highest ranking one presented first, or (3) otherwise having a presentation mechanism for the highest ranking channel being the default for selection.

The favorites may be presented to the user using the channel numbers, based upon the station names (e.g., ABC, NBC, CBS, ESPN, FOX, CNN), or a combination thereof. The use of station names provides a significant convenience to the user in not having to mentially recall the subject matter of particular channels, such as EPSN for Sports based content or CNN for news based content.

As it may be observed the favorites (or a portion thereof) are automatically selected by the system in a manner free from explicit user definition. In this manner the user does not have to laboriously program his favorites into the system. In addition, it may be observed the favorites (or a portion thereof) are automatically updated or otherwise modified by the system in a manner free from explicit user selection. This dynamic generation of the initial favorites and the dynamic updating of the favorites is straightforward for the user and in essence permits the building of a list of favorites from the available channels, as opposed to removing those channels that are not desirable from a list of available channels that may number in the hundreds.

For the preferred remote control, there is a single "favorites" button that activates the favorites selection. In this manner, the user is free from being required to associate different "favorites" channels with different buttons on the remote control. The remote control, television, and/or other device in communication with the remote control may identify the channels, determine the favorites, and store the results.

The system may further include identification of the user in some manner. In this manner, separate favorites may be determined and maintained. In this manner, a 4 year old child will likely have a different set of favorites than a 17 year old child. Also, the favorites button may likewise be "virtual" in nature as being soft buttons displayed on a display device such as the television or remote control.

It is to be understood that any video presentation device may be used, such as for example, a personal computer, handheld display device, cellular phone, etc. In addition, any of the video presentation devices may likewise include a remote control, although the functionality may be performed without a remote control, if desired.

The invention claimed is:

1. A method for modifying a set of favorite channels of a video presentation device for a user comprising:
   (a) said user selecting a first set of a plurality of different channels representative of said user's favorite channels during a first time interval, and selecting a second set of a plurality of different channels representative of said user's favorite channels during a second time interval;
   (b) respectively storing each of said first set of a plurality of different channels and said second set of a plurality of different channels in an arrangement that is selectively, visually presentable to said user on said video presentation device; and
   (c) automatically modifying said arrangement of channels within at least one of said first set and said second set, independently of each other, based hierarchically upon the duration that said different channels are viewed relative to other channels within their respective set, tabulated over a temporal time period, and wherein the duration that channels are viewed during time intervals outside of that associated with the respective said at least one of said first set and said second set, are not included in said tabulation for modifying the arrangement of channels within the respective said at least one of said first set and said second set; and
   (d) incrementally tuning a display device, tuned to and visually presenting a first channel in a normal display mode over the whole of a screen of said display device, to a next sequential channel selected only from a respective one of said user's favorite channels during an applicable said time interval, in automatic response to a user's sole action of activating a single input on a remote.

2. The method of claim 1 where said first time interval is a first day of the week and said second time interval is a second day of the week, different from said first day of the week.

3. The method of claim 1 wherein said first time interval is a first time range in a day and said second time interval is a second time range in a day, different from said first time range.

4. The method of claim 1 wherein said temporal time period is a plurality of days.

5. The method of claim 1 wherein one of said plurality of selected different channels is free from modifying said set of favorite channels if said duration is less than a threshold.

6. The method of claim 5 wherein said threshold is 20 seconds.

7. The method of claim 1 wherein said set of favorite channels is less than all available channels.

8. The method of claim 1 wherein said modifying is further based upon the time of day that said different channels are selected.

9. The method of claim 1 wherein said modifying is further based upon the day of the week that said different channels are selected.

10. The method of claim 1 wherein said modifying is further based upon the day of the month that said different channels are selected.

11. The method of claim 1 wherein said modifying is further based upon the content of said selected different channels.

12. The method of claim 1 wherein said favorite channels are presented to the user including station names.

13. The method of claim 1 wherein said set of favorite channels is determined in a manner free from explicit user definition.

14. The method of claim 1 wherein said set of favorite channels is determined in an additive manner from available channels.

15. The method of claim 3 wherein said favorite channels are displayed as a result of selecting said favorite functionality with a remote control, where said set of favorite channels is determined in a manner free from explicit user definition.

16. The method of claim 1 further comprising identifying said user.

* * * * *